United States Patent
Sebbane et al.

(10) Patent No.: US 12,289,412 B2
(45) Date of Patent: Apr. 29, 2025

(54) METHOD AND SYSTEM FOR AUTHENTICATION AND ENCRYPTION

(71) Applicants: Danny Sebbane, Tel Aviv (IL); David Cohen, Givat Ada (IL)

(72) Inventors: Danny Sebbane, Tel Aviv (IL); David Cohen, Givat Ada (IL)

(*) Notice: Subject to any disclaimer, the term of this patent is extended or adjusted under 35 U.S.C. 154(b) by 211 days.

(21) Appl. No.: 18/203,064

(22) Filed: May 30, 2023

(65) Prior Publication Data

US 2024/0405989 A1   Dec. 5, 2024

(51) Int. Cl.
*H04L 9/32* (2006.01)
*G06F 21/62* (2013.01)

(52) U.S. Cl.
CPC .......... *H04L 9/3213* (2013.01); *G06F 21/629* (2013.01); *G06F 2221/2103* (2013.01)

(58) Field of Classification Search
CPC ................ H04L 9/3213; G06F 21/629; G06F 2221/2103
See application file for complete search history.

(56) References Cited

U.S. PATENT DOCUMENTS

| | | | | |
|---|---|---|---|---|
| 11,462,120 B2* | 10/2022 | Garg | ...................... | H04L 9/3297 |
| 2005/0039057 A1* | 2/2005 | Bagga | ..................... | G06F 21/46 726/19 |
| 2012/0109829 A1* | 5/2012 | McNeal | .................. | G16H 10/65 705/67 |
| 2015/0371020 A1* | 12/2015 | Yin | .......................... | H04L 67/10 726/30 |
| 2019/0095596 A1* | 3/2019 | Manganelli | ............. | G06F 21/32 |
| 2020/0396277 A1* | 12/2020 | Yin | ......................... | G06F 21/31 |

* cited by examiner

*Primary Examiner* — J. Brant Murphy
(74) *Attorney, Agent, or Firm* — Naomi S. Rosenman-Helfand

(57) ABSTRACT

A method, apparatus and computer program product, the method comprising: an enrollment phase, comprising: retrieving information related to a trigger subject and generating a question a potential answer, wherein the trigger subject is concealed therein; generating and transmitting to the device a first token; generating a second token for encrypting data of the user or the device; and deleting the second token; and an account setting phase, comprising: regenerating the question and potential answer; regenerating the first token; transmitting the question to the user and receiving an answer; upon verifying that the answer being in line with the potential answer and that the first token provided is correct: upon the second token not being regenerated, regenerating the second token; transmitting to the device the second token, to be used by the device for receiving the service or data; and verifying deletion of the second token from the device.

18 Claims, 4 Drawing Sheets

METHOD AND SYSTEM FOR AUTHENTICATION AND ENCRYPTION

TECHNICAL FIELD

The present disclosure relates to a user and device authentication and key encryption in general, and to a method and system for authentication and encryption using a zero-knowledge proof, in particular.

BACKGROUND

Authentication is the act of proving an assertion, such as the identity of a computer system user. In most computer environments, a user first has to identify, i.e., claim an identity. At a subsequent phase, the identity needs to be verified, also referred to as authentication. In some embodiments, the platform used by the user, such as a mobile phone, a laptop computer or desktop computer needs to be verified as well.

Most current systems use multi-factor authentication, which requires two or more factors. IN the case of two factors, this is referred to as the two factor Authentication (2FA) paradigm. One factor may relate to something the user needs to demonstrate knowledge about, such as a password, a PIN number, a personal fact such as your first pet's name, or the like. Another factor may relate to something the user has, such as a device, a token, or the like, or some bodily feature, such as a voice signature, a fingerprint, an iris print, or the like.

The combination of something the user knows and something the user has (and/or something the user is) does not enable an imposter to access the user's account, assets or the like, without having access to a specific object and the user's relevant knowledge.

However, this is not always sufficient, as an imposter may obtain the user's device, and may also know the user closely enough or otherwise obtain the knowledge, for example by phishing, and thus gain access to the user's assets.

BRIEF SUMMARY

One exemplary embodiment of the disclosed subject matter is a computer-implemented method for securing digital access to a service or data, comprising: an enrollment phase comprising: retrieving information related to a trigger subject previously provided by a user of a device; based on the information, one or more questions related to the trigger subject, and determining one or more potential answers to the questions, wherein the trigger subject is concealed within the questions and the potential answers; generating a first token and transmitting the first token to the device; generating a second token and using the second token for encrypting data related to the user or the device; and deleting the second token; and an account setting phase comprising: regenerating the questions and the potential answers from the information; regenerating at least the first token; transmitting one or more of the questions to the user; receiving from the user one or more answers to the questions; upon verifying that the answer being in line with the potential answers and that the first token provided by the device is correct: upon the second token not being regenerated, regenerating the second token; transmitting to the device the second token, to be used by the device in communication for receiving the service or data; and verifying deletion of the second token from the user's device. Within the method, the enrollment phase may further comprise: registering details of the device; transmitting a unique ID to the device; and receiving the trigger subject from the user. Within the method, the trigger subject is optionally suggested by the user. Within the method, the trigger subject is optionally selected by the user from a plurality of potential trigger subjects. Within the method, generating the questions and the potential answers optionally comprises: extracting one or more relevant segments from the information; identifying an entity within the segments; composing one or more questions for which the entity is the potential answer; and concealing the trigger subject from the questions and the potential answers. Within the method, the first token is optionally based on one or more of the questions. Within the method, the second token is optionally based on one or more of the potential answers. Within the method, verifying that the answer being in line with the potential answers optionally comprises short or long versions or known abbreviation of acceptable entities, or an allowable deviation from a numeric value.

Another exemplary embodiment of the disclosed subject matter is a computerized apparatus having a processor, the processor configured to perform: an enrollment phase comprising: retrieving information related to a trigger subject previously provided by a user of a device; based on the information, one or more questions related to the trigger subject, and determining one or more potential answers to the questions, wherein the trigger subject is concealed within the questions and the potential answers; generating a first token and transmitting the first token to the device; generating a second token and using the second token for encrypting data related to the user or the device; and deleting the second token; and an account setting phase comprising: regenerating the questions and the potential answers from the information; regenerating at least the first token; transmitting one or more of the questions to the user; receiving from the user one or more answers to the questions; upon verifying that the answer being in line with the potential answers and that the first token provided by the device is correct: upon the second token not being regenerated, regenerating the second token; transmitting to the device the second token, to be used by the device in communication for receiving the service or data; and verifying deletion of the second token from the user's device. Within the apparatus, the steps of the enrollment phase may further comprise: registering details of the device; transmitting a unique ID to the device; and receiving the trigger subject from the user. Within the apparatus, communication between the apparatus and the device optionally uses a Virtual Private Network (VPN). Within the apparatus, the trigger subject is optionally suggested by the user. Within the apparatus, the trigger subject is optionally selected by the user from a plurality of potential trigger subjects. Within the apparatus, generating the questions and the potential answers optionally comprises: extracting one or more relevant segments from the information; identifying an entity within the segments; composing a question for which the entity is the potential answer; and concealing the trigger subject from the question and the potential answer. Within the apparatus, the first token is optionally based on the question. Within the apparatus, the second token is optionally based on the potential answer. Within the apparatus, verifying that the answer being in line with the potential answer optionally comprises short or long versions or known abbreviation of acceptable entities, or an allowable deviation from a numeric value.

Yet another exemplary embodiment of the disclosed subject matter is a computer program product comprising a non-transitory computer readable storage medium retaining program instructions configured to cause a processor to perform actions, which program instructions implement: an enrollment phase comprising: retrieving information related to a trigger subject previously provided by a user of a device; based on the information, one or more questions related to the trigger subject, and determining one or more potential answers to the questions, wherein the trigger subject is concealed within the questions and the potential answers; generating a first token and transmitting the first token to the device; generating a second token and using the second token for encrypting data related to the user or the device; and deleting the second token; and an account setting phase comprising: regenerating the questions and the potential answers from the information; regenerating at least the first token; transmitting one or more of the questions to the user; receiving from the user one or more answers to the questions; upon verifying that the answer being in line with the potential answers and that the first token provided by the device is correct: upon the second token not being regenerated, regenerating the second token; transmitting to the device the second token, to be used by the device in communication for receiving the service or data; and verifying deletion of the second token from the user's device.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosure relates to the need to authenticate a user using a device for accessing sensitive data or services, such as personal accounts, bank accounts, digital assets, or the like.

In the discussion below, the terms "key", token", or similar terms may be used interchangeably and are to be widely construed to refer to a sequence of one or more symbols used for identifying an entity, deciphering data, or the like.

One technical problem associated with current authentication relates to the risks existing in the 2FA paradigm. In traditional implementations of the paradigm, an imposter or intruder can get hold of what the user has, such as the user's device. The intruder can also obtain what the user knows in this context, for example by obtaining a plurality of personal data through stealing documentation or hacking the user's activities for example in social network, and thus get access to the user's accounts or other assets.

Another technical problem associated with available solutions relates to the difficulty of the user to remember complex passwords, the exact response with the exact spelling the user previously gave to identifying questions, or the like. Current systems are not user-friendly, since they allow no room even for small mistakes, such as in the exact spelling of foreign grandparents' names.

Yet another technical problem associated with available solutions relates to the need to store personal data of a user in the provider's databases, thus exposing them to attacks aimed at the provider and risking the data of a plurality of users. Additionally, current systems are more exposed to replay attacks and phishing attacks which can lead to subsequent intrusion. These hacks are also quite easy to implement, thus exposing organizations and users to a plurality of attack attempts.

One technical solution provided by the disclosure comprises a combination of generative artificial intelligence (AI) and Zero Knowledge Protocol (ZKP) for authenticating a user wishing to connect to a system, take actions, or the like.

In some embodiments, on an enrollment phase, in addition to registering a device and/or application used by a user, the user may also provide one or more trigger subjects. In other embodiments, the user may select one or more trigger subjects from subjects suggested by the system. In some embodiments, the trigger subject may be a named entity, such as Albert Einstein, a favorite sports team, a historical event, or the like.

Figure 1A:
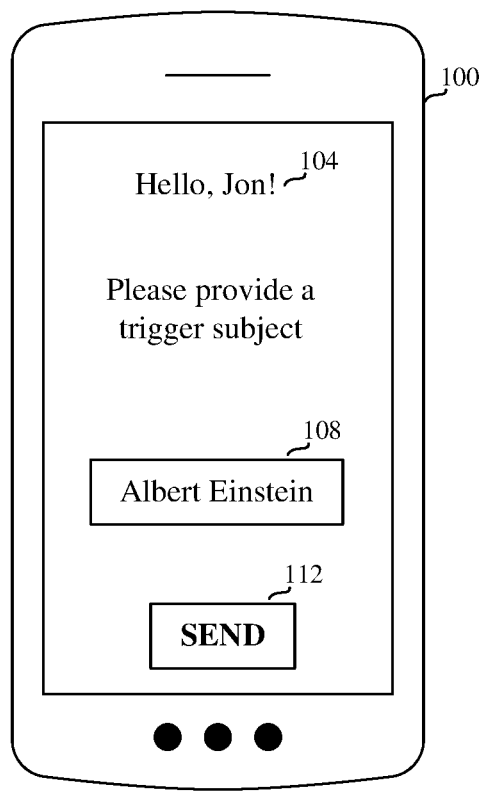
FIG. 1A shows an exemplary screen of an enrollment phase of a dedicated authorization application, or an authorization of a service-providing application, in accordance with some exemplary embodiments of the disclosure.

FIG. 1A shows an exemplary screen 100 of an enrollment phase of a dedicated authorization application, or an authorization of a service-providing application, in accordance with some exemplary embodiments of the disclosure. The user may have identified herself to the system, for example at least by a user name, and therefore the user is addressed by name 104.

The application may then ask the user to provide a trigger subject, to which the user provides a response 108, such as "Albert Einstein". The user may then hit "Send" button 112, and the trigger subject may be provided to the system.

The system may then check if the trigger subject is acceptable, for example whether it is a named entity, whether enough content is available for generating questions and answers upon the trigger subject, or the like. If the trigger subject is acceptable, the system may retrieve information related to the trigger subject, for example from a public source. The system may then activate a generative AI engine upon the content, to compose questions and answers related to the trigger subjects, wherein the answers are objective, such as "when was Albert Einstein born", "who is the coach of the Knicks", or the like.

The system may conceal the trigger subject such that it does not appear in the body of the questions nor in the expected answers, such that a person viewing the question or answer cannot know who or what the question or answer refers to. In the examples above, the questions may be phrased as "when was he born", "who is the coach of the team", or the like.

The question and answer generation may be performed during enrollment and/or at a later stage, when the user tries to access the protected data or service, as detailed below.

After enrollment, when the user attempts to login to the system for receiving data or service, the system may transmit one or more of the questions to the user and receive the user's response. If the response is correct, or within a range of correct answers, for example with a name being misspelled but close beyond a predetermined threshold to a correct answer, the user may be authenticated and allowed to access the data or service.

Figure 1B:
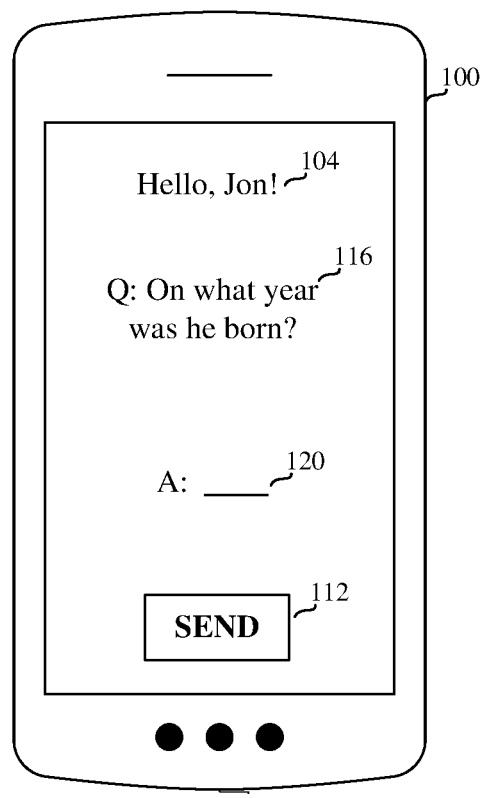
FIG. 1B shows the exemplary screen of the device during login phase, in accordance with some exemplary embodiments of the disclosure.

FIG. 1B shows the screen of a device during a login phase, in accordance with some exemplary embodiments of the disclosure. Thus, screen 100 shows question 116 "when was he born", such that the subject of the question is concealed and a person who does not know who the question refers to has very low chances of guessing correctly. A text box 120 is provided for the user to type the answer. In further embodiments, the user may speak the answer and a speech to text engine may analyze the audio to recognize the answer.

Figure 1C:
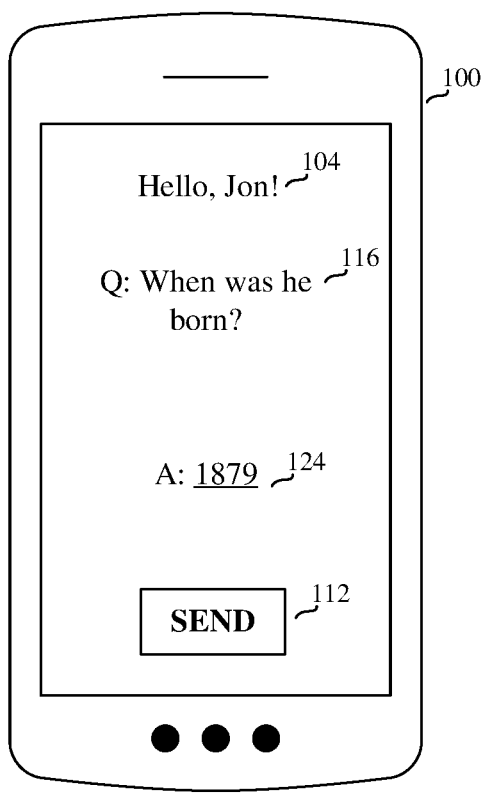
FIG. 1C shows the exemplary screen of the device during login phase screen with the user's answer, in accordance with some exemplary embodiments of the disclosure.

FIG. 1C shows the screen of the device during login phase screen 100 with the user's answer, in accordance with some exemplary embodiments of the disclosure. Thus, the user provides 124 which reads "1879", which reflects the year when the trigger subject, Albert Einstein, was born, but wherein the name does not appear in the question nor in the answer.

In some embodiments, encryption keys may be generated upon the questions and/or answers, and the user's data may be encrypted with one of the keys, while the key itself may be deleted. Upon the user providing correct answers to one or more concealed questions, the key may be reconstructed and provided to the user for accessing the data.

Thus, without exchanging the trigger subject itself but only transmitting questions and receiving answers related thereto, the user may authenticate against the server.

The question and answer exchange may be repeated when the user tries to login from another device, a different IP address, a different location if the user previously connected from a desktop computer or the like. The question and answer exchange may also be repeated periodically, after the user did not login for a predetermined period of time, every random or predetermined number of logins, or the like, when the user connects from the same device.

Once the user has been authenticated, the service-providing application may be activated, and the user may operate therein.

Figure 1D:
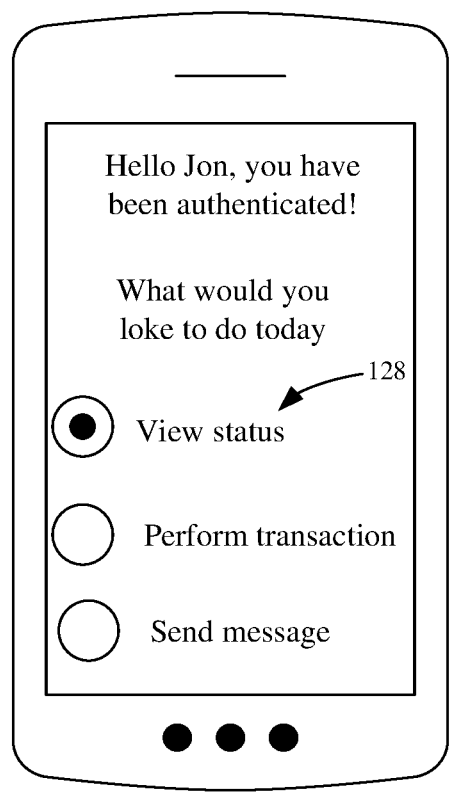
FIG. 1D shows the exemplary screen of the device once the user has been authenticated, in accordance with some exemplary embodiments of the disclosure.

FIG. 1D shows the exemplary screen of the device executing the application once the user has been authenticated and is suggested 128 various options of using the application, in accordance with some exemplary embodiments of the disclosure.

In some embodiments, the authentication may be performed by a dedicated application that is separate from the service-providing application which the user wants to use, and may be performed by a different server, which provides the authentication service to a plurality of applications. In alternative embodiments, the authentication may be performed by a module of the service-providing application, and may thus be servicing only the specific application.

In some embodiments, the questions may be provided to the user's device at a later time and are not exchanged between the sides during enrollment. The questions may change between activations, and therefore cannot be replayed or phished.

One technical effect of the disclosure relates to providing a secure method and system for accessing data or services. The method is based on the ZKP, and the questions and answers are concealed such that they do not reveal the trigger subject, thus the method and system are secured, and an intruder cannot obtain the subject by hacking or phishing.

Another technical effect of the disclosure relates to the system and method being based on general knowledge related to a subject that the user chose and is thus supposed to know well, therefore the user does not have to memorize, repeat, or fabricate and remember facts or answers. Moreover, the system may be more forgiving to small mistakes, such as abbreviations, spelling mistakes, small mistakes in a numeric values, or the like. On the other hand, no personal data of the user needs to be stored within the system, thereby making the user feel more secure and less subject to hacks.

Yet another technical effect of the disclosure relates to the system and method requiring significantly more processing power than conventional methods, for analyzing the information related to the trigger subject, composing and enhancing the questions and answers, comparing the answers, and generating and using the keys. These computational requirements put a higher entry barrier on imposters or hackers, and thus make it harder for them to crack the authentication.

Yet another technical effect of the disclosure relates to keeping the user's data in an encrypted manner, wherein the encryption key may not be stored, such that the data cannot be accessed unless the user provides correct answers to the questions.

Figure 2:
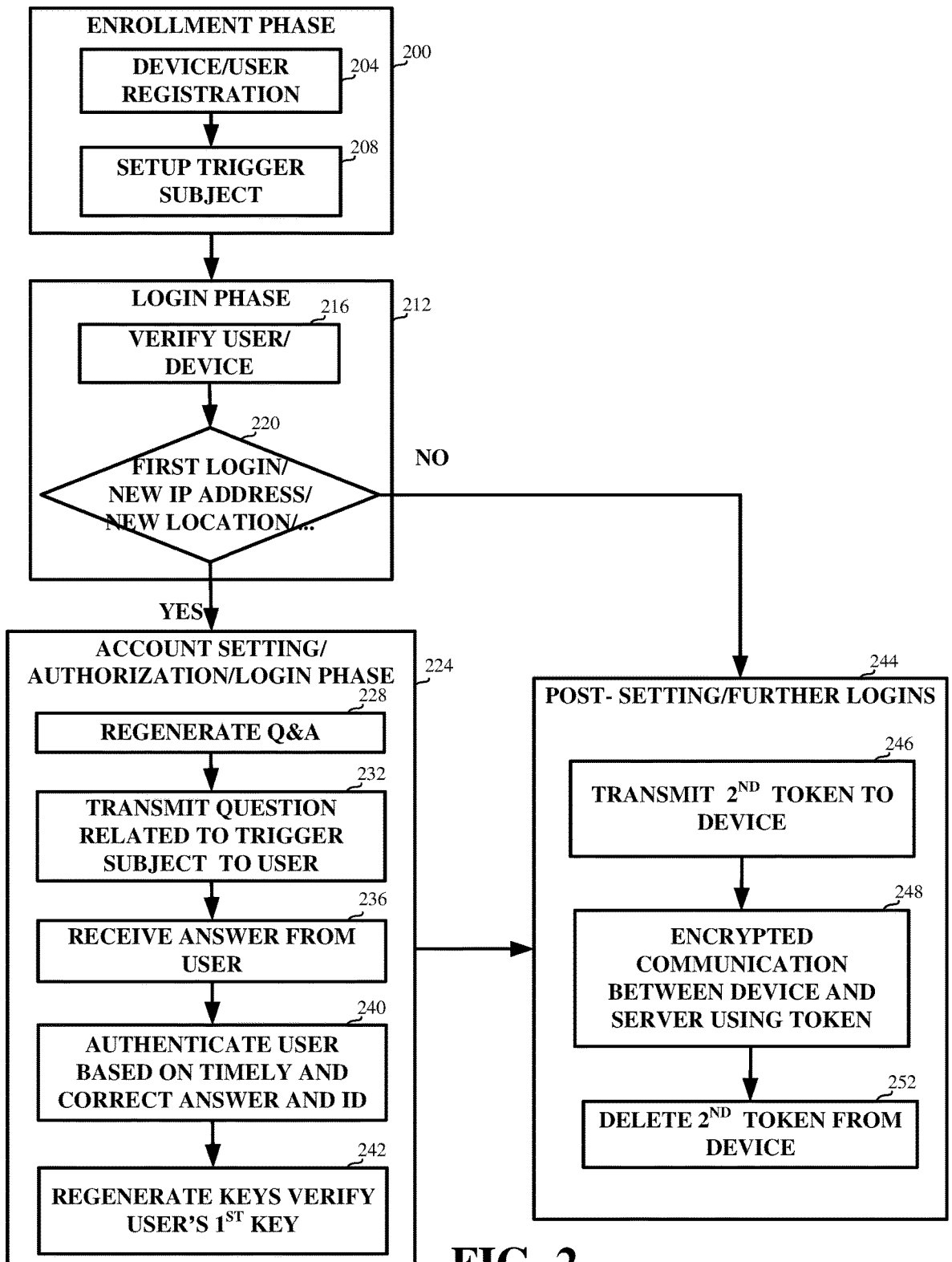
FIG. 2 is a flowchart of steps in a method for authenticating a user and device, in accordance with some exemplary embodiments of the disclosure.

Referring now to FIG. 2, showing a flowchart of steps in a method performed by a server for authenticating a user and a device, such that the user can be provided with a service, in accordance with some exemplary embodiments of the disclosure.

The method comprises an enrollment phase 200, in which a user creates an account, and a login phase 212 in which the user attempts to login to the account. If this is the first time the user tries to login, or the user is trying to login from a new device, a new IP address, a new location, or the like, an account setting/authorization/login phase 224 may be performed. Following account setting/authorization/login phase 224, or skipping it if not necessary, on post-setting/further logins step 242 the user can connect to the system and may perform actions, receive data, or the like.

On enrollment phase 200, after the user has downloaded the service-providing application to the device and installed it, on step 204 the user and the device may register. The application may automatically download or may guide the user to download a separate authentication application. In further embodiments, the authentication application may be part of the service-providing application.

Registration step 204 may comprise receiving from the user a user name, account number or other identifying details, and optionally a password as is traditionally done. Registering step 204 may further include registering the IP address of the device, its location, or the like. Registering step 204 may further include transmitting a ID unique for the device, to be stored on the device and provided on further communications as detailed below.

On step 208, a trigger subject may be set up between the user and the system and within the system.

Figure 3:
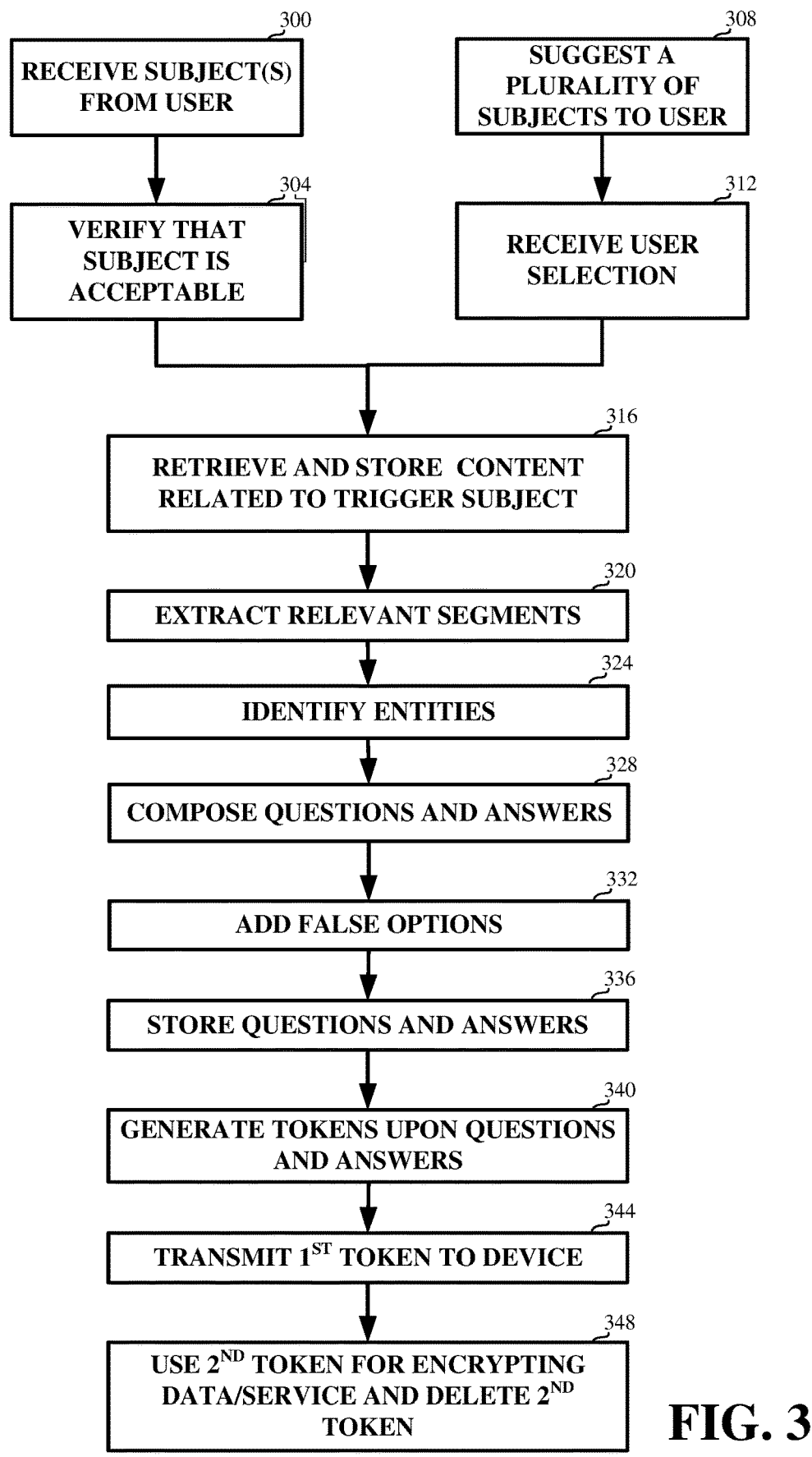
FIG. 3 is a flowchart of steps in a method for setting up a trigger subject, in accordance with some exemplary embodiments of the disclosure.

Referring now to FIG. 3, showing a flowchart of steps in a method for setting up a trigger subject, in accordance with some exemplary embodiments of the disclosure.

The trigger subject may be suggested by the user, or selected by the user from a plurality of options suggested by the system.

Thus, on step 300, a suggested trigger subject may be received from a user, as shown in FIG. 1A above.

On step 304, it may be verified that the subject is acceptable. For example, it may be verified that the subject is a named entity, has Internet presence, is not a private person or location, is not controversial, for example by analyzing the language in a plurality of Internet sites related to the subject, the subject is associated with enough content to generate a plurality of questions, or the like.

If the subject suggested by the user is unacceptable, the user may be encouraged to suggest another subject.

In alternative embodiments, on step 308 the system may suggest a plurality, for example three, subjects to the user to select from, and on step 312 the user's selection may be received. If the user does not select any of the subjects, further subjects may be suggested.

It is appreciated that the disclosure is not limited to a single subject, and that a plurality of subjects may be agreed upon between the user and the system either way (i.e., suggested by the user or the system).

Once a subject is agreed upon, on step 316, content related to the subject may be obtained, for example from a public source such as Wikipedia®. The content may be stored on a storage device associated with an apparatus implementing the method, to ensure that the content will be available when needed, and also in order not to create expected traffic when the user logs in, which may be detectable to a hacker, using a sniffer.

On step 320, relevant segments may be extracted from the content, for example segments containing numbers or other named entities, which may be candidates for generating questions. In some embodiments, the relevant segments may be the first segments within the information, which may comprise basic information of the subject that is reasonable for a person accepting or suggesting the subject to know.

On step 324, entities, such as named entities or other specific entities, may be identified within the relevant segments, such as dates, numbers, people, locations, historic events, or the like.

On step 328, questions and answers may be composed, such that an answer to such question may be the entity. For example, a question may be on where or what year a certain event happened, wherein the answer is the extracted year. The questions and answers are phrases such that they do not disclose any information about the selected triggers. The question is formulated in a way that conceals the trigger as well as closely related entities. Similarly, the answer is scrutinized to ensure that it does not directly reveal any information about the identity of the trigger. If an answer would disclose the trigger, the entire question and answer are removed to prevent any potential secrets from being revealed to listeners or hackers.

The questions and answers may be generated using a generative AI engine, such as the roberta-base-squad2 model available from Huggingface of 20 Jay Street, Brooklyn, NY 11201, USA.

On step 332 the questions and answers may be enhanced. Enhancement may include adding wrong answers as false alternatives for multi-choice questions. Enhancement may further include concealing similar entities or entities that may reveal the name of the subject. For example if the subject is a person, the names of relatives of the person may be concealed as well.

On step 336 The questions and answers may be stored for later usage. In alternative embodiments, the questions and answers may be generated upon need, e.g., when required to authenticate a user that selected the subject.

On step 340, a token pair may be generated upon the concealed questions and answers. For example, multiple questions may be converted to tokens and concatenated or otherwise combined into a single key, and similarly for the answers. The tokens may be an implementation of the public/private key scheme, or any other encryption scheme. In some embodiments, a symmetric key may be derived for two-side encryption rather then asymmetric keys.

On step 344, one of the tokens, also referred to as the first token, such as the questions token, may be transmitted to the user's device and stored therein for later validation, for example it may be stored in a local vault protected with the user selected password.

On step 348, the other token, also referred to as the second token, such as the answers token may be used for encrypting the information or service available to the user, such as the user's transactions, data or the like. The second token may then be deleted, such that the information is encrypted but the key for decrypting it is unavailable. The encrypted data may be stored in a storage space allocated by the provider of the service the user wishes to consume, in a storage space provided by the encryption provider, or the like.

It is appreciated that the method of FIG. 3 is not limited to a single subject, and a predetermined number of trigger subjects may be agreed upon, such that when authenticating the user, one or more of the subjects may be selected.

Referring now back to FIG. 2. When the user wishes to login, login phase 212 may comprise user/device verification step 216, which may comprise verifying the device using the unique ID and optionally the user, including for example according to the IP address, user name and/or password, or the like.

On step 220, it may be checked whether this is the first login from this device, or if another change has been noted, such as a different IP address, a different location, or the like, or authentication is required for another reason.

If this is indeed the case ("Yes"), account setting/authorization/login phase 224 may take place.

Account setting/authorization/login phase 224 may comprise the user's device transmitting the unique ID to the server, such that the server can verify the unique ID prior to continuing the setting or authorization.

In some embodiments, account setting/authorization/login phase 224 may comprise restarting the client, such as a VPN client on the same device with which the user registered, and within a predetermined time period, such as one hour after completing the registration. In some embodiments, no communication such as an e-mail, a text message, or a verification link may be sent, in order to eliminate the number of vector surfaces which may be possibly attacked.

Account setting/authorization/login phase 224 may comprise step 228 in which the server may regenerate the questions and answers based on the downloaded content and optionally additional factors such as the user device's unique ID. It is appreciated that generation of the questions and answers is performed in a deterministic manner and based upon the content as downloaded and non-changing factors, such that identical questions and answers are always generated. The unique signature of the questions and answers may be specifically tailored by their type and order to a device with a 128 bit entropy score of uniqueness.

In some embodiments, the server may also generate the first token, as provided to the device during enrollment.

Account setting/authorization/login phase 224 may comprise step 232 of transmitting to the user one or more of the questions related to the trigger subject. The question may be sent as plain text. Alternatively, the questions may be encrypted using the first token. The user's device may decrypt the question using the first token if required, and display the question on a screen, play an audio of the question generated using text-to-speech (TTS), or the like. As detailed above, although the question relates to the trigger subject, neither the trigger subject nor any revealing details may appear in the question, such that a hacker obtaining the question wouldn't know what the question relates to and wouldn't be able to answer it correctly.

On step 236, an answer may be received from the user, as typed text, audio which may undergo speech recognition, or the like. The answer may or may not be encrypted with the first token.

On step 240, upon the server verifying the user's answer, the user may be authenticated. Verifying the user's answer may include regenerating the tokens and decrypting the user's answer using the first token if required, and comparing the user's answer to the answer as have been regenerated. In further embodiments, the answer may be provided by the user without encryption, in which case the first token may also be transmitted by the user's device for authentication purposes. Authentication may thus include checking the correct answer to the concealed question as described above, wherein the answer is provide within a predetermined time frame, verifying that the first token available to the user is consistent with the regenerated first token, and verifying the device ID as provided during enrollment. Since the answer to the question is concealed, even if a hacker obtains all tokens and keys from the user device's vault, the hacker will still have to answer a concealed question from the server to be granted with a complementary key to the protected data or service.

In some embodiments, steps 232, 236 and 240 may comprise the exchange of a predetermined number of questions and answers, for example two or three such questions which the user has to answer correctly in order to be authenticated.

In some embodiments, following a wrong answer, the user may be suggested to correct the answer, or be presented with another question on the same subject or another subject agreed upon between the user and system.

In some embodiments, a minimum of a predetermined number of correct answers for a predetermined number of questions may be acceptable for authentication, for example at least 3 correct answers for 5 questions.

In some embodiments, the answer may not be required to be 100% accurate. For example, if the question relates to a year, a deviation of plus or minus one year if the answer is within the last 20 years, or a deviation of up to 10 years if the answer is between 20 years and 100 years ago, and so on, may be sufficient to be considered a correct answer, preferably if authorization requires the user to provide answers to more than one question. Similarly, one or more spelling mistakes may be allowed if the answer is a name, in particular a foreign name. For example, if the user replaced "a" with "e", "ea" with "ee", "ph" with "f", or the like, an answer may still be considered correct. In some embodiments, known abbreviations or short/long versions of acceptable entities may be accepted, such as FC for "football club".

On step 242, upon the verification of the user as above, the second key may be generated, if not previously generated, upon the questions and answers.

Once the user has been authenticated, or if user authentication is not required ("No" on step 220), the service may be provided on post-setting/further login step 244.

Thus, on step 246, the second token may be transmitted to the user's device. By the server providing to the client the second token with which the server encrypted the user's data, for example on step 348, a secured tunnel is available for both passing encrypting data (using the first encryption key in the device) and when using the on-the-fly key (second key on login only) a user can perform authentication against the remote service/machine on the cloud. The second token may then be deleted from the server, at this stage or at any other time until the user logs out or is otherwise disconnected from the service. It is appreciated, however, that deleting the token as soon as possible provides additional protection against attacks.

On step 248, the user may use the device to access the information, perform transactions, or the like, from the application, as shown in FIG. 1D, using the second token with which the information has been encrypted. Thus, the privileged user will be granted access from the user's device to a service, database machine or application. Using the second token, the user's device may decrypt data it receives from the server, Alternatively or additionally, the server may operate as a proxy, perform the decryption remotely and send the data to the user's device.

On step 252, the server may delete, or make sure that the second token is deleted from the user's device, such that the user will have to re-login to the server for reconnecting to the application and accessing the data. The second token with which the information is encrypted, is thus stored nowhere, neither on the server nor on the user's device.

In some embodiments, the user may connect to the application and service only from a dedicated VPN client, and only from the device that was installed and authenticated as detailed above.

Figure 4:
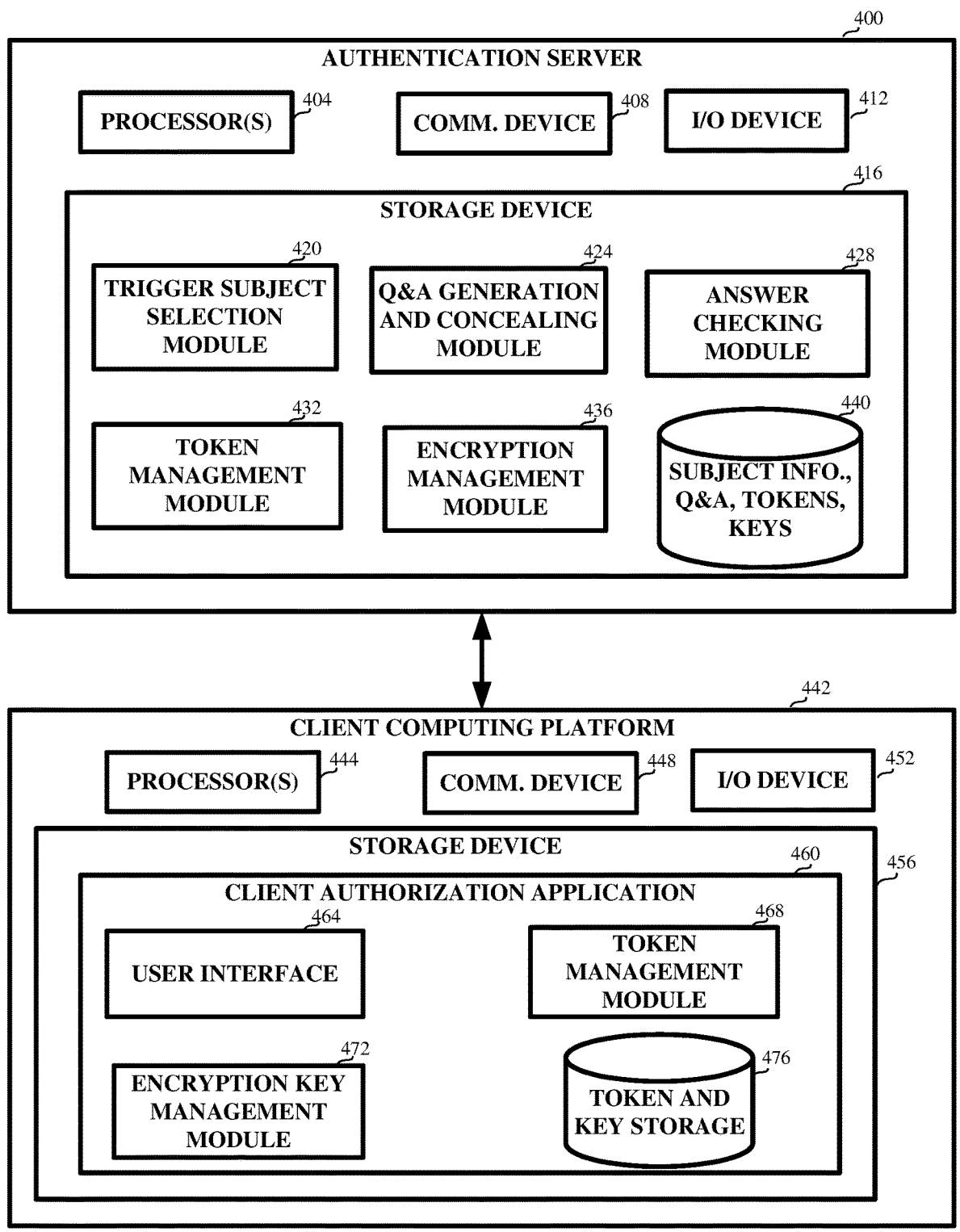
FIG. 4 is a schematic block diagram of an apparatus for authenticating a user and device, in accordance with some exemplary embodiments of the disclosure.

Referring now to FIG. 4, showing a schematic block diagram of an apparatus for authenticating a device and user, comprising an authentication server 400 executing a server side of the authentication platform, and a client computing platform 442 executing a client of the authentication platform, in accordance with some exemplary embodiments of the disclosed subject matter. In some embodiments, client computing platform may operate only from a dedicated Virtual Private Network (VPN) client and must be the same device used for installation, authentication and consuming the service.

In some exemplary embodiments, authentication server 400 may be a local server, a cloud server, a desktop computer, a mobile computer, or the like Authentication server 400 may comprise one or more processor(s) 404. Processor 404 may be a Central Processing Unit (CPU), a microprocessor, an electronic circuit, an Integrated Circuit (IC) or the like. Processor 404 may be utilized to perform computations required by apparatus 400 or any of its subcomponents.

In some exemplary embodiments of the disclosed subject matter, authentication server 400 may comprise a communication device 408, for communication with one or more client computing platforms 442, the internet, other servers, or the like.

In some embodiments, communication device 408 and corresponding communication device 448 may use a secured tunnel for passing encryption as well as consuming the required service.

In some exemplary embodiments of the disclosed subject matter, authentication server 400 may comprise an Input/

Output (I/O) device 412 such as a display, a pointing device, a keyboard, a touch screen, a microphone, a speaker, or the like. I/O device 412 may be utilized to provide output to and receive input from a user such as an administrator, for example confirmation that trigger subjects are appropriate during enrollment, confirmation that questions or answers are not revealing the trigger subject, confirmation that questions or answers are not offending, or the like.

In some exemplary embodiments, authentication server 400 may comprise a storage device 416. Storage device 416 may be a hard disk drive, a Flash disk, a Random Access Memory (RAM), a memory chip, or the like. Storage device 416 may comprise one or more devices, whether co located or remote from each other. In some exemplary embodiments, storage device 416 may retain program code operative to cause processor 404 to perform acts associated with any of the subcomponents of authentication server 400. The components detailed below may be implemented as one or more sets of interrelated computer instructions, executed for example by processor 404 or by another processor. The components may be arranged as one or more executable files, dynamic libraries, static libraries, methods, functions, services, or the like, programmed in any programming language and under any computing environment.

Storage device 416 may store module 420 for suggesting to a user one or more trigger subjects and receiving the user selection, or receiving from a user a suggested trigger subject. If the user suggests a trigger subject, trigger subject selection module 420 may check whether the subject is acceptable, for example whether it is a named entity, whether enough content is available for generating questions and answers, or the like. If the trigger subject is acceptable, the system may retrieve content related to the trigger subject, for example from a public source.

Storage device 416 may store questions and answers generation module 424 for generating or regenerating questions and answers related to one or more trigger subjects. Generating the questions and answers may include extracting relevant segments from the content previously obtained for the subject; identifying entities therein, such as names, dates, locations, or the like; composing questions to which the entities are the answers; validating the correctness of the answers, and enhancing the questions and answers. Enhancing may include, for example, rephrasing answers such that the answers are verbal rather than numbers or dates, verifying that the questions or answers do not reveal the trigger subject, that they are not offensive, or the like. Enhancing may utilize a user interface component (not shown) for receiving a confirmation for the questions and answers. It is appreciated that the questions/answers are generated in a deterministic manner and based upon the content as downloaded and optionally the device unique ID, such that identical questions and answers will also be generated for the content and the user or the device.

Storage device 416 may store answer checking module 428 for checking whether an answer provided by a user is an adequate answer to a question. For example, if the question relates to a year, a deviation of plus or minus one year if the answer is within the last 20 year, or a deviation of up to 10 years if the answer is between 20 years and 100 years ago, and so on, may be sufficient to be considered a correct answer, preferably if the authorization requires more than one question and answer. Similarly, one or more spelling mistakes may be allowed if the answer is a named entity, in particular a foreign name. For example, if the user replaced "a" with "e", "ea" with "ee", "ph" with "f", or the like, an answer may still be considered correct. Additionally, common abbreviations or short;/long forms may also be considered acceptable answers.

Storage device 416 may store token management module 432 for generating tokens, optionally based on the questions and/or answers, storing the tokens, providing the tokens to a user device and checking whether a token received from a user device is identical to the stored token. Token management module 432 may also be responsible for deleting the second token from the user's device at the end of the session.

Storage device 416 may store encryption management module 436 for, providing an encryption key to a user device, and checking whether an encryption key received from a user device is identical to the stored encryption key, encrypting and decrypting the data, or the like.

Storage device 416 may store or be in operative communication with another storage 440. Storage 440 may store the information related to one or more trigger subjects, the generated questions and answers, tokens, encryption keys, or the like. In some embodiments, storage 440 may also comprise a separate storage or vault holding sensitive data related for example to the service the user wishes to consume, and maintained separately from authentication server 400 or other storage devices associated with storage device 416.

Client computing platform 442 may be implemented as a mobile phone, mobile assistant, a tablet computer, a laptop computer, a desktop computer, a server or the like, having an application installed thereon. In alternative embodiments, client computing platform 442 may be implemented as a web application, a web page, or the like.

Client computing platform 442 may be in communication with server authorization server 400. It will be appreciated that a plurality of client computing platforms 442 can communicate with one or more authorization servers 400.

Client computing platform 442 may comprise processor 444, communication device 448, I/O device 452 and storage device 456, analogous to processor 404, communication device 408, I/O device 412 and storage device 416 of authentication server 400. I/O device 452 may be used by a user wishing to authenticate for suggesting a trigger subject, selecting from trigger subjects suggested by the system, providing answers to questions, or the like.

Storage device 456 may comprise client authorization application 460 which has been installed on client computing platform 442.

Client authorization application 460 may comprise user interface 464 for the user to suggest a trigger subject, select from trigger subjects suggested by the system, answering authentication questions, or the like.

Client authorization application 460 may comprise token management module 468 for receiving one or more tokens, storing them and sending them before or after answering questions, for verifying the device.

Client authorization application 460 may comprise encryption management module 472 for receiving one or more encryption keys, storing the encryption key, and sending them during communication with the service-providing server, for securing the communication. Encryption management module 472 may also be operative in receiving a second token and using the second token to decrypt the required information after being authenticated.

Client authorization application 460 may comprise or be in operative communication with database 476 comprising for example tokens, encryption keys, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for securing digital access to a service or data, comprising:
   an enrollment phase comprising:
      retrieving information related to a trigger subject previously provided by a user of a device;
      based on the information, generating at least one question related to the trigger subject, and determining at least one potential answer to the at least one question, wherein the trigger subject is concealed within the at least one question and the at least one potential answer;
      generating a first token and transmitting the first token to the device;
      generating a second token and using the second token for encrypting data related to the user or the device; and
      deleting the second token; and
   an account setting phase comprising:
      regenerating the at least one question and the at least one potential answer from the information;
      regenerating at least the first token;
      transmitting the at least one question to the user;
      receiving from the user an answer to the at least one question;
      upon verifying that the answer being in line with the at least one potential answer and that the first token provided by the device is correct:
         upon the second token not being regenerated, regenerating the second token;
         transmitting to the device the second token, to be used by the device in communication for receiving the service or data; and
         verifying deletion of the second token from the user's device.

2. The method of claim 1, wherein the enrollment phase further comprises:
   registering details of the device;
   transmitting a unique ID to the device; and
   receiving the trigger subject from the user.

3. The method of claim 1, wherein the trigger subject is suggested by the user.

4. The method of claim 1, wherein the trigger subject is selected by the user from a plurality of potential trigger subjects.

5. The method of claim 1, wherein generating the at least one question and the at least one potential answer comprises:
   extracting at least one relevant segment from the information;
   identifying an entity within the at least one segment;
   composing at least one question for which the entity is the answer; and
   concealing the trigger subject from the at least one question and the at least one potential answer.

6. The method of claim 1, wherein the first token is based on the at least one question.

7. The method of claim 1, wherein the second token is based on the at least one potential answer.

8. The method of claim 1, wherein verifying that the answer being in line with the at least one potential answer comprises short or long versions or known abbreviation of acceptable entities, or an allowable deviation from a numeric value.

9. A computerized apparatus having a processor, the processor configured to perform:
   steps of an enrollment phase, comprising:
      retrieving information related to a trigger subject previously provided by a user of a device;
      based on the information, generating at least one question related to the trigger subject, and determining at least one potential answer to the at least one question, wherein the trigger subject is concealed within the at least one question and the at least one potential answer;
      generating a first token and transmitting the first token to the device;
      generating a second token and using the second token for encrypting data related to the user or the device; and
      deleting the second token; and
   steps of an account setting phase, comprising:
      regenerating the at least one question and the at least one potential answer from the information;
      regenerating at least the first token;
      transmitting the at least one question to the user;
      receiving from the user an answer to the at least one question;
      upon verifying that the answer being in line with the at least one potential answer and that the first token provided by the device is correct:
         upon the second token not being regenerated, regenerating the second token;
         transmitting to the device the second token, to be used by the device in communication for receiving the service or data; and
         verifying deletion of the second token from the user's device.

10. The apparatus of claim 9, wherein the steps of the enrollment phase further comprise:
    registering details of the device;
    transmitting a unique ID to the device; and
    receiving the trigger subject from the user.

11. The apparatus of claim 9, wherein communication between the apparatus and the device uses a Virtual Private Network (VPN).

12. The apparatus of claim 9, wherein the trigger subject is suggested by the user.

13. The apparatus of claim 9, wherein the trigger subject is selected by the user from a plurality of potential trigger subjects.

14. The apparatus of claim 9, wherein generating the at least one question and the at least one potential answer comprises:
    extracting at least one relevant segment from the information;
    identifying an entity within the at least one segment;

composing at least one question for which the entity is the answer; and concealing the trigger subject from the at least one question and the at least one potential answer.

15. The apparatus of claim 9, wherein the first token is based on the at least one question.

16. The apparatus of claim 9, wherein the second token is based on the at least one potential answer.

17. The apparatus of claim 9, wherein verifying that the answer being in line with the at least one potential answer comprises short or long versions or known abbreviation of acceptable entities, or an allowable deviation from a numeric value.

18. A computer program product comprising a non-transitory computer readable storage medium retaining program instructions configured to cause a processor to perform actions, which program instructions implement:

steps of an enrollment phase, comprising:

retrieving information related to a trigger subject previously provided by a user of a device;

based on the information, generating at least one question related to the trigger subject, and determining at least one potential answer to the at least one question, wherein the trigger subject is concealed within the at least one question and the at least one potential answer;

generating a first token and transmitting the first token to the device;

generating a second token and using the second token for encrypting data related to the user or the device; and deleting the second token; and steps of an account setting phase, comprising:

regenerating the at least one question and the at least one potential answer from the information;

regenerating at least the first token;

transmitting the at least one question to the user;

receiving from the user an answer to the at least one question;

upon verifying that the answer being in line with the at least one potential answer and that the first token provided by the device is correct:

upon the second token not being regenerated, regenerating the second token;

transmitting to the device the second token, to be used by the device in communication for receiving the service or data; and verifying deletion of the second token from the user's device.

\* \* \* \* \*